(12) United States Patent
Sun et al.

(10) Patent No.: US 11,931,892 B2
(45) Date of Patent: Mar. 19, 2024

(54) THREE DEGREE-OF-FREEDOM ROBOTIC SYSTEMS FOR AUTOMATIC AND/OR COLLABORATIVE PLANAR FASTENING OPERATIONS

(71) Applicant: GM GLOBAL TECHNOLOGY OPERATIONS LLC, Detroit, MI (US)

(72) Inventors: Qiao Sun, Shanghai (CN); Xianbao Chen, Shanghai (CN); Jing Sun, Shanghai (CN); Feng Gao, Shanghai (CN); Dalong Gao, Rochester, MI (US); Ningjian Huang, Bingham Farms, MI (US)

(73) Assignees: GM GLOBAL TECHNOLOGY OPERATIONS LLC, Detroit, MI (US); Shanghai JiaoTong University, Shanghai (CN)

( * ) Notice: Subject to any disclaimer, the term of this patent is extended or adjusted under 35 U.S.C. 154(b) by 242 days.

(21) Appl. No.: 17/554,161

(22) Filed: Dec. 17, 2021

(65) Prior Publication Data
US 2023/0150118 A1    May 18, 2023

(30) Foreign Application Priority Data
Nov. 17, 2021    (CN) .......................... 202111363396.2

(51) Int. Cl.
*B25J 13/08*    (2006.01)
*B25J 9/00*    (2006.01)
*B25J 9/16*    (2006.01)

(52) U.S. Cl.
CPC ........... *B25J 9/0081* (2013.01); *B25J 9/0009* (2013.01); *B25J 9/0045* (2013.01); *B25J 9/1633* (2013.01); *B25J 13/085* (2013.01)

(58) Field of Classification Search
CPC ........ B25J 9/0009; B25J 9/003; B25J 9/0045; B25J 9/0081; B25J 9/107; B25J 9/1633;
(Continued)

(56) References Cited

U.S. PATENT DOCUMENTS

D628,609 S    12/2010 Linn et al.
7,992,733 B2    8/2011 Laliberte et al.
(Continued)

OTHER PUBLICATIONS

U.S. Appl. No. 17/554,549, filed Dec. 17, 2021, Sun et al.

*Primary Examiner* — Dale Moyer (57) ABSTRACT

A robotic system includes a support structure, a motor mount assembly, first and second parallel chains, a serial translation assembly, a sensor and a control module. The motor mount assembly includes rotary motors, where the rotary motors include a first rotary motor and a second rotary motor. The first and second parallel chains are connected to the movable platform, the rotary motors and the motor mount assembly. The serial translation assembly is connected to the supporting structure and the motor mount assembly and includes a linear actuator and a third rotary motor. The sensor is connected to the movable platform and detects force applied by a human operator on the movable platform and generates a signal indicative of the force applied. The control module controls the rotary motors and the third rotary motor based on the signal to assist the human operator in moving the movable platform.

20 Claims, 6 Drawing Sheets

(58) Field of Classification Search
CPC ................ B25J 13/085; G05B 19/423; G05B 2219/36429; G05B 2219/40586
See application file for complete search history.

(56) References Cited

U.S. PATENT DOCUMENTS

| | | |
|---|---|---|
| 8,181,799 B2 | 5/2012 | Laliberte et al. |
| 8,424,941 B2 | 4/2013 | Ihrke et al. |
| 8,498,741 B2 | 7/2013 | Ihrke et al. |
| 8,511,964 B2 | 8/2013 | Linn et al. |
| 8,562,049 B2 | 10/2013 | Ihrke et al. |
| 8,601,897 B2 | 12/2013 | Lauzier et al. |
| 8,849,453 B2 | 9/2014 | Bergelin et al. |
| 9,085,308 B2 | 7/2015 | Laliberte et al. |
| 9,266,440 B2 | 2/2016 | Gao et al. |
| 9,359,176 B2 | 6/2016 | Gao et al. |
| 9,770,993 B2 | 9/2017 | Zhao et al. |
| 2011/0010012 A1* | 1/2011 | Murayama ......... G05B 19/4182 700/260 |
| 2013/0112641 A1 | 5/2013 | Laliberte et al. |
| 2013/0151009 A1* | 6/2013 | Okazaki ................ B25J 9/1633 700/260 |
| 2016/0039093 A1* | 2/2016 | Abdallah ............... B25J 9/1687 700/258 |
| 2017/0108098 A1* | 4/2017 | Abdallah ............... B25J 9/0048 |
| 2018/0361521 A1* | 12/2018 | Takeda ................ B23Q 7/1405 |
| 2019/0299397 A1* | 10/2019 | Rogers .................... B25J 9/107 |

\* cited by examiner

THREE DEGREE-OF-FREEDOM ROBOTIC SYSTEMS FOR AUTOMATIC AND/OR COLLABORATIVE PLANAR FASTENING OPERATIONS

CROSS-REFERENCE TO RELATED APPLICATIONS

This application claims the benefit of Chinese Patent Application No. 202111363396.2, filed on Nov. 17, 2021. The entire disclosure of the application referenced above is incorporated herein by reference.

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to robotic systems used for fasteners during production.

During production of, for example, a vehicle, numerous fasteners (e.g., nuts, screws, bolts, etc.) are fastened to vehicle devices, assemblies, components and structures. The fasteners may be fastened manually or using a fully automatic robotic system. When attached manually, a considerable amount of time is associated with setting, tightening (referred to herein as "running"), and properly torqueing down the fasteners. Cross-threading errors can occur when the fasteners are fastened manually, which slows production and increases costs due to the repair and/or replacement of the parts involved. At the same time, the operator needs to hold an electric tightening gun, which can take great strength to hold. If this process is repeated continuously, it can cause fatigue.

Although a fully automated robotic system can save time installing fasteners, the fully automated system is configured for a particular application and a particular device and/or component. For example, if nuts are being installed on an engine, the automated robotic system includes a one stop station that is configured for the particular engine and nuts involved. The nuts are typically the same size. The automated robotic system is not applicable to other devices and/or components. In addition, the fully automated system may include multiple fastening tools (e.g., nut runners) for fastening the nuts. A fully automated robotic system is bulky, complex and expensive.

SUMMARY

A robotic system is provided and includes a support structure, a motor mount assembly, first parallel chains, second parallel chains, a serial translation assembly, a sensor and a control module. The motor mount assembly includes rotary motors, where the rotary motors include a first rotary motor and a second rotary motor. The first parallel chains are connected to the movable platform, the first rotary motor, and the motor mount assembly. The second parallel chains are connected to the movable platform, the second rotary motor, and the motor mount assembly. The serial translation assembly is connected to the supporting structure and the motor mount assembly and includes a linear actuator and a third rotary motor. The sensor is connected to the movable platform and configured to detect force applied by a human operator on the movable platform and generate a signal indicative of the force applied. The control module is configured to control the rotary motors and the third rotary motor based on the signal to assist the human operator in moving the movable platform relative to the supporting structure.

In other features, the first parallel chains include a first chain and a second chain. The first chain extends parallel to the second chain. The second parallel chains include a third chain and a fourth chain. The third chain extends parallel to the fourth chain.

In other features, the first parallel chains include a first chain. The first chain is connected to a first motor of the motor mount assembly and to a plate of the motor mount assembly. The second parallel chains include a second chain. The second chain is connected to a second motor of the motor mount assembly and to the plate of the motor mount assembly.

In other features, the first parallel chains include an upper outer chain and a lower inner chain disposed inward and below the upper outer chain.

In other features, the lower inner chain includes two parallel extending chains.

In other features, the first parallel chains include: a first chain including three joints, a link, two bars and a fork; and a second chain including five joints and three bars.

In other features, the first parallel chains include: a first chain including first revolute joints; and a second chain including second revolute joints.

In other features, the first parallel chains and the second parallel chains provide a two parallelogram-shaped arrangements.

In other features, the first parallel chains, the second parallel chains, the motor mount assembly and the serial translation assembly provide three degrees-of-freedom motion for the movable platform.

In other features, the robotic system further includes a fastening tool attached to at least one of the movable platform and the sensor.

In other features, the linear actuator includes: a belt; first guide rails; a mounting block slidable on the first guide rails and connected to the motor mount assembly and the belt; second guide rails; and a counterbalance weight slidable on the second guide rails and connected to the belt.

In other features, a robotic system is provided and includes: a support structure; a movable platform; a motor mount assembly, parallel chain sets, a serial translation assembly and a control module. The motor mount assembly includes rotary motors, where the rotary motors include a first rotary motor and a second rotary motor. The parallel chain sets are connected to the movable platform and the rotary motors via the motor mount assembly and provide a parallelogram-shaped arrangement. The serial translation assembly is connected to the supporting structure and the motor mount assembly and includes a linear actuator and a third rotary motor, where the linear actuator moves the parallel chain sets based on output of the third rotary motor. The control module is configured to control the rotary motors and the third rotary motor to provide three degrees-of-freedom motion of the movable platform relative to the supporting structure.

In other features, the parallel chain sets include: a first upper outer chain; a second upper outer chain providing a first parallelogram-arrangement with the first upper outer chain; a first lower inner chain; and a second lower inner chain providing a second parallelogram-arrangement with the first lower inner chain.

In other features, each of the first upper outer chain, the second upper outer chain, the first lower inner chain and the second lower inner chain include joints and bars connected serially.

In other features, the first upper outer chain extends parallel to the first lower inner chain. The second upper outer chain extends parallel to the second lower inner chain.

In other features, the first lower inner chain includes two chains. The second lower inner chain includes two chains.

In other features, the robotic system further includes a sensor connected to the movable platform and configured to detect force applied by a human operator on the movable platform and generate a signal indicative of the force applied. The control module is configured to control operation of the rotary motors and the third rotary motor to assist the human operator in movement of the movable platform.

In other features, the parallel chain sets are configured to move parallel to a plane.

In other features, the parallel chain sets provide: a first loop for translation of the movable platform; and a second loop to compensate for torque exerted on the movable platform.

In other features, the linear actuator includes: a belt; first guide rails; a mounting block slidable on the first guide rails and connected to the motor mount assembly and the belt; second guide rails; and a counterbalance weight slidable on the second guide rails and connected to the belt.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Fully automated robotic systems typically include controllers, motors, arms, end effectors, sensors, etc. for automatically positioning, setting, attaching and/or fastening components. No human interaction is involved. Each of the fully automatic robotic systems are application limited, complex, expensive and require a considerable amount of space.

The examples set forth herein include 3-DOF robotic systems (referred to as the "robotic systems") that are automatic and/or collaborative. Fastening operations may be performed automatically and/or collaboratively. The robotic systems utilize human senses and intelligence to ensure fast and accurate fastening at the beginning of an operation while leaving the majority of operations with the robotic system alone. The robotic systems include platforms that are moveable by a system operator with little resistance and include fastening tools that once positioned perform fastening operations without aid of the system operator. The robotic systems have light to middle duty payload capability and are low cost and flexible, such that each robotic system is applicable to many different devices and components.

The examples set forth herein include robotic systems that are able to perform fastening operations, including vehicle related and non-vehicle related fastening operations. The robotic systems may be used on, for example, vehicle systems, vehicle sub-systems, engines, instrument panels, wheels, doors, panels, etc. The robotic systems are able to perform multiple fastening operations while being in a same orientation both automatically and collaboratively. The robotic systems include: parallel chains for translation in a first direction (e.g., a horizontal direction); and serial translation assemblies for translation in a second direction (e.g., a vertical direction). Parallel chains in the first direction help with resisting fastening tool torque. The robotic systems are compact and provide large workspaces.

FIGS. 1-5 show a 3-DOF robotic system 100 mounted on a stand 102. The stand 102 may include two platforms (or tables) 104, 105 that support the 3-DOF robotic system 100 and a device (e.g., an engine) 106, which are disposed respectively on the platforms 104, 105. Although the device 106 is shown, other worked on objects may be disposed on the platform 105. The first platform 104 may be disposed at a higher level than the second platform 105. An operator 108 stands in front of the device 106 and may move an outward protruding end 109 of the 3-DOF robotic system 100 to set a fastener on the device 106. The operator 108 may move the outward protruding end 109 via handles 110 to move a fastening tool (e.g., a nut runner) 112 having a fastener holding tip 114 to the location on the device 106 where the fastener is to be attached and fastened to the device 106. The fastening tool 112 may hold various fastener holding tips for various types and styles of fasteners. Each fastener holding tip may be adjustable for difference types and styles of fasteners.

The 3-DOF robotic system 100 includes a frame (or stand) 120 that has a top plate 122 and a bottom plate 123, which sits on and may be attached to the platform 104. The 3-DOF robotic system 100 is a hybrid serial/parallel system, further includes: (i) a parallel system of chains 124, and (ii) a serial translation assembly 126. The first part of the hybrid serial/parallel system (i.e. the serial translation assembly 126) provides vertical movement and the second part of the hybrid serial/parallel system (i.e. the parallel system 124) provides horizontal movement. The overall hybrid serial/parallel systems 100 are configured to move the fastening tool 112 in three translational directions (e.g., the Cartesian x, y, z directions). The parallel system of chains 124 are configured to move parallel to a plane. The plane may extend horizontally and/or parallel to the supporting platforms 104, 105. The serial translation assembly 126 is configured to move the parallel system of chains 124 in one direction (usually a direction outside the plane created by the motions from parallel mechanism 124, e.g., a vertical direction).

Figure 2:
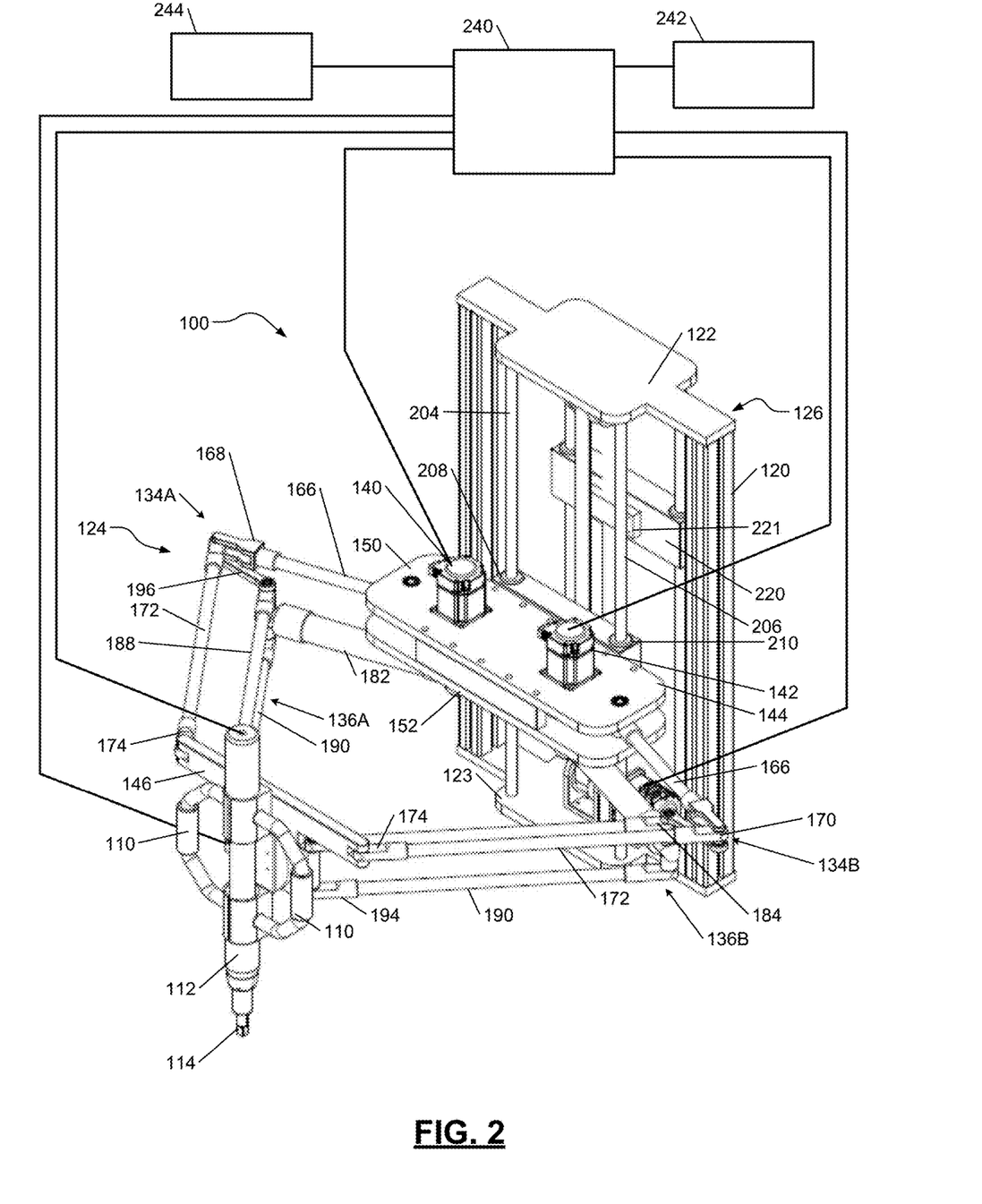
FIG. 2 is a top front perspective view of the 3-DOF robotic system of FIG. 1.
Figure 3:
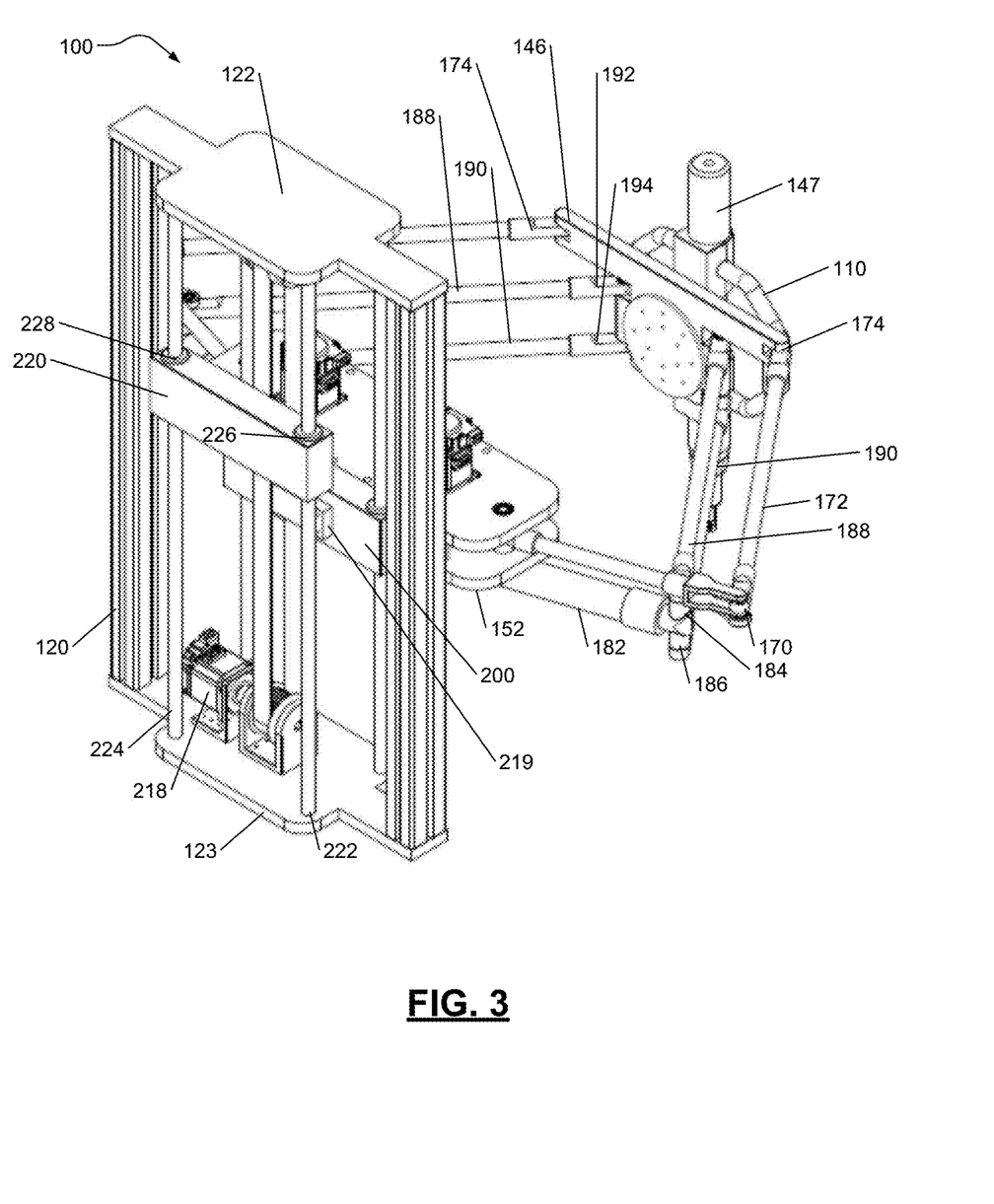
FIG. 3 is a top rear perspective view of the 3-DOF robotic system of FIG. 1.
Figure 4:
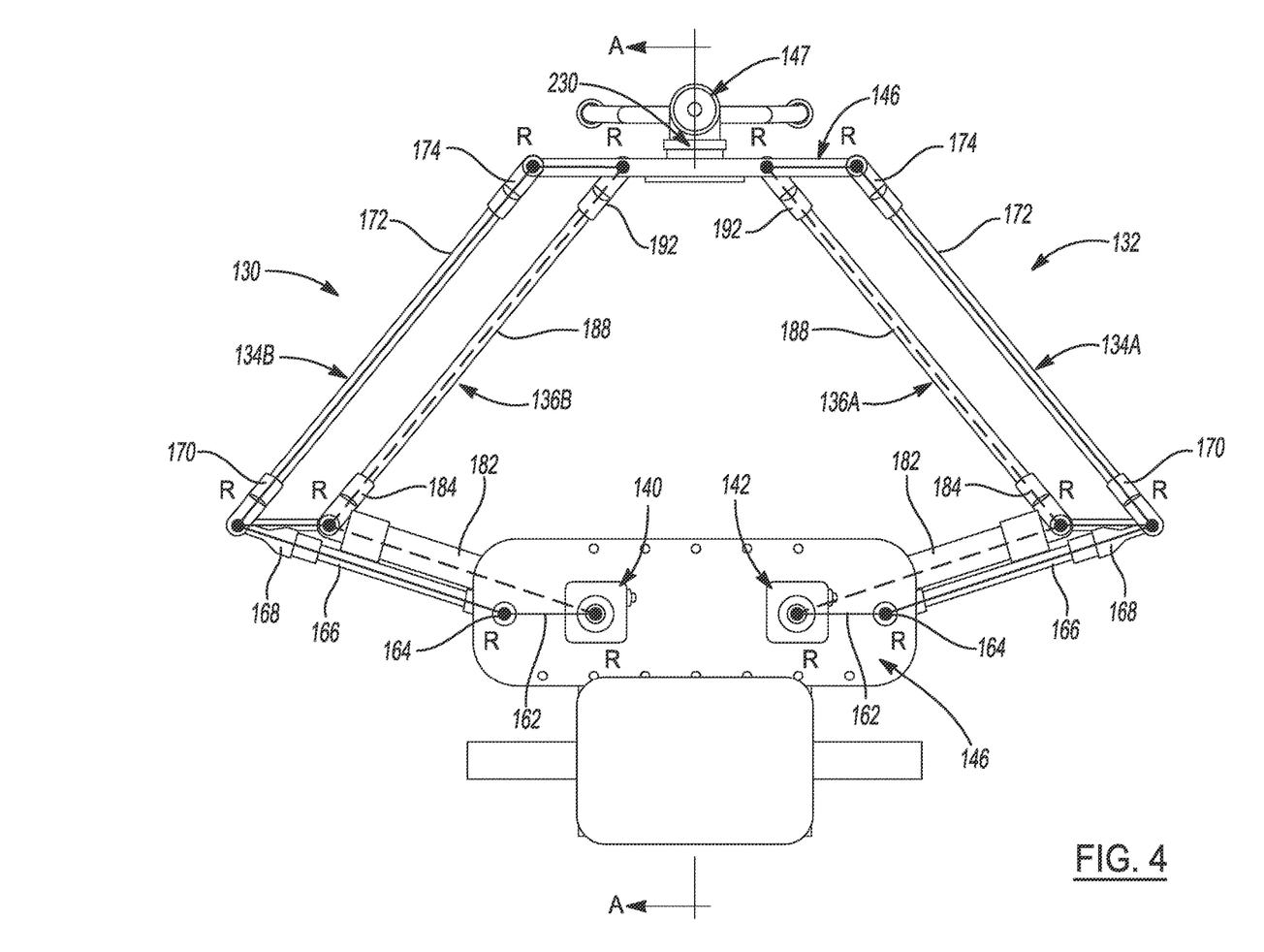
FIG. 4 is a bottom view of the 3-DOF robotic system of FIG. 1.

The parallel systems of chains 124 includes two sets of hybrid serial/parallel chains 130, 132. The sets of parallel chains 130, 132 include the inner loop/pair of chains consisting of chain 136B (bars 182 and 188) on the left and chain 136A (bars 182 and 188) on the right, best seen in FIG. 4. In FIG. 4, joints are shown as dots and links are shown as line segments. Motors 142, 144 drive chains 136B and 136A and move the platform 146 for planar 2DOF motions. The sets of parallel chains 130, 132 also include the outer loop/pair of chains consisting of chain 134B (bars 166 and 172) on the left and chain 134A (166 and 172) on the right, best seen in FIG. 4. The inner loop/pair of chains 136A, 136B is connected to the outer loop/pair of chains 134A, 134B using links (one of the links is designated 196 in FIG. 2) such that two parallelograms are forced on each side. The parallelograms restrict rotation of the platform 146 within a plane of motion such that the platform 146 is only able to move along the 2 translational directions within the plane. In order to further increase the rigidity of the platform 146 against out of plane rotation, each of the chains 136A and 136B is implemented with two parallel bars 188, 190, as shown in FIGS. 2-4.

The motor mount assembly 144 includes a first plate 150 and a second plate 152. The second plate 152 is disposed away from and connected to the first plate 150, such that a gap exists between the first plate 150 and the second plate 152. The motors 140, 142 are mounted on the motor mount platform 144 and move a respective one of the two parallel systems of chains 124.

Each of the outer chains 134 may start with the plate 150 (referred to as the "ground link") and includes a first joint 164, a first bar 166, a fork 168, a second joint 170, a second bar 172 and a third joint 174 which connects to the platform 146. The plate 150 provides a ground link for each of the chains 134, which is represented by lines 162. Each of the joints 164, 170, 174 is a revolute joint. The start of the parallel chain plate 150 is connected to the first joint 164. The first joint 164 is connected to the first plate 150 of the motor mount platform 144 and the first bar 166. The fork 168 is connected to the first bar 166 and the second joint 170. The second joint 170 is connected to the fork 168 and the second bar 172. The third joint 174 is connected to the second bar 172 and the movable platform 146.

Each of the inner chains 136 may start with the plate 150 (or ground link) and includes a first joint 180, a first bar 182, a pair of joints (second and third joints) 184, 186, a second bar 188, a third bar 190, a fourth joint 192, and a fifth joint 194. Each of the joints 180, 184, 186, 192, 194 is a revolute joint. The first joint 180 is connected to one of the motors 140, 142 and the first bar 182. The pair of joints 184, 186 are connected to the first bar 182, the second bar 188, and the third bar 190. The pair of joints 184, 186 connect the first bar 182 to the second and third bars 188, 190. The fourth joint 192 is connected to the second bar 188 and the movable platform 146. The fifth joint 194 is connected to the third bar 190 and the movable platform 146. The pair of joints 184, 186 is connected to the third joint 170 of the upper outer chain 130 via a link 196.

Figure 5:
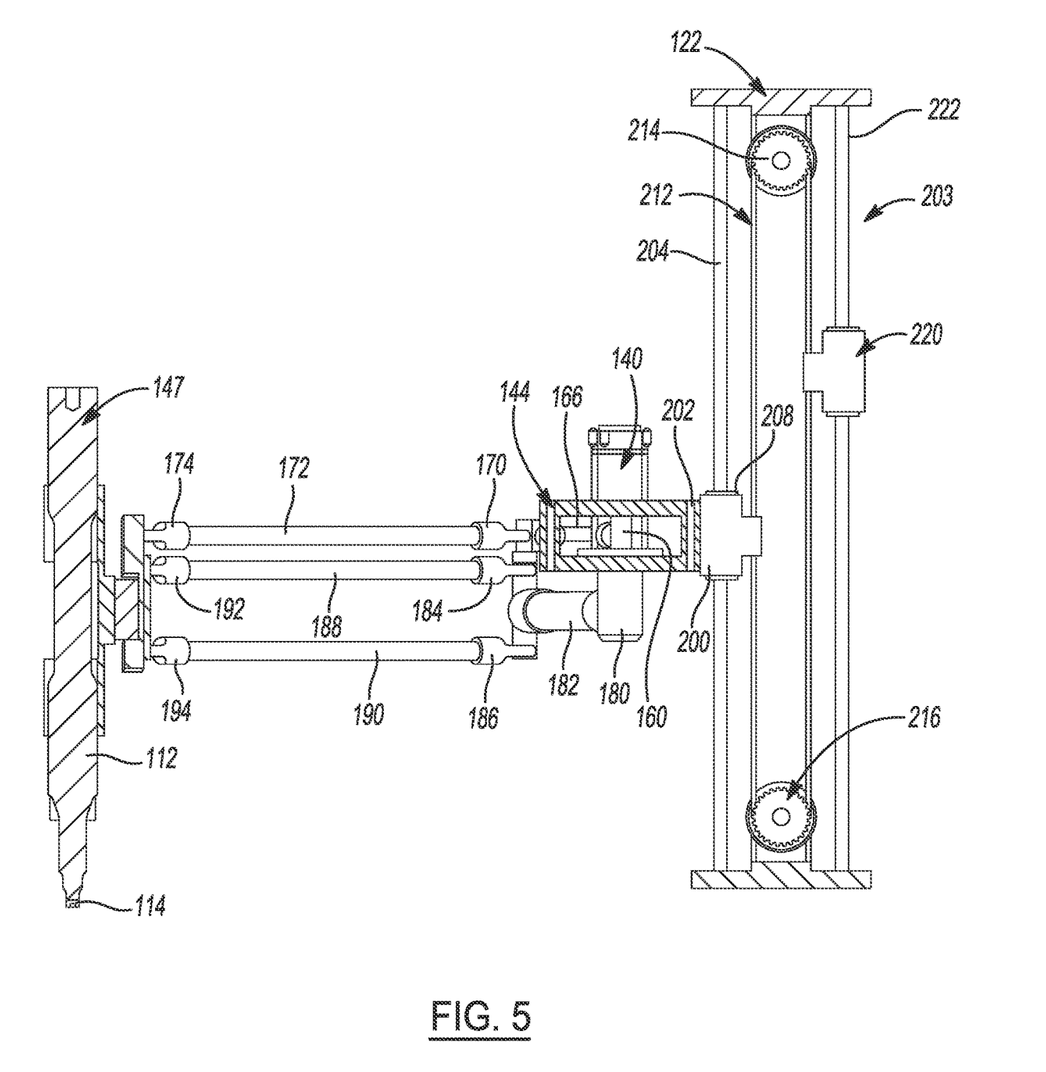
FIG. 5 is a side cross-sectional view of a portion of the 3-DOF robotic system of FIG. 1 at section line A-A of FIG. 4.

The serial translation assembly 126 includes a mounting block 200 connected to the motor mount assembly 144 via a plate 202 and a linear actuator 203. The mounting block 200 may slide on first guide rails 204, 206 that extend through bushings 208, 210 in the mounting block 200 and between and connect to the plates 122, 123.

The linear actuator 203 moves the mounting block 200 in a linear direction (e.g., in a vertical direction). In one embodiment, the linear actuator 203 includes a belt 212 that is driven on first and second rollers 214, 216 via a rotary motor 218. The first roller 214 is attached to a shaft of the rotary motor 218. The second roller 216 may be connected to the top plate 122 and is free to rotate. The belt 212 is attached to the mounting block 200 via a first attachment plate 219 and to a counterbalance weight 220 via a second attachment plate 221. The counterbalance weight 220 is used to counterbalance the weight of the mounting block 200, the motor mount assembly 144, the motors 140, 142, the hybrid serial/parallel systems of chains 124, the movable platform 146, the fastening tool 112, the handles 110, and a sensor 230, which may be mounted on the movable platform 146. The counterbalance weight 220 may slide on second guide rails 222, 224 that extend through bushings 226, 228 in the counterbalance weight 220 and between and connect to the plates 122, 123. In another embodiment, the linear actuator 203 includes a ball screw instead of a belt for moving the mounting block 200 in a linear direction.

The sensor 230 may be attached to the movable platform 146. In one embodiment, the sensor 230 is attached between the movable platform 146 and the fastening tool 112. A control module 240 is connected to the rotary motors 140, 142, 216, the sensor 230, and the fastening tool 112. The control module 240 controls operation of the rotary motors 140, 142, 216 and the fastening tool 112 based on signals from the sensor 230 and an input device 242. The sensor 230 may be mounted to the platform 146 as shown and provides feedback to the control module 240. In one embodiment, the sensor 230 is a 6-dimensional sensor that measures force exerted on the platform 146 by the operator 108. The sensor 230 measures forces in Cartesian coordinate directions (x, y, z). The sensor 230 may measure force and torque exerted on the platform 146 by the operator 108 and the fastening tool 112. In one embodiment, only three channels of the sensor 230 are used to measure force in x, y, z directions and corresponding angular torques about the x, y, z axes.

A control module 240 controls positioning of the movable platform 146 and thus the fastening tool 112 relative to the frame 120, the supporting platforms 104, 105 and the device 106. The control module 240 may detect force applied on the handles 110 via the sensor 230 and in response provide active compliance by assisting the operator 108 in movement of the moveable platform 146 in the direction of the applied force based on feedback from the sensor 230. The moveable platform 146 may be moved in x, y, z directions. The control module 240 assists the operator 108 in movement of the movable platform 146 relative to a supporting structure, such as the platforms 104, the frame 120, plates 122, 123, and/or other supporting structure.

Although the serial translation assembly 126 is shown in a vertical arrangement and being configured to move the hybrid serial/parallel systems of chains 124 and thus the movable platform 146 is a vertical direction, the serial translation assembly 126 may be arranged to move the platform at an angle relative to the supporting platform 104. Also, the serial translation assembly 126 and/or the hybrid serial/parallel systems of chains 124 may be arranged upside down.

Figure 1:
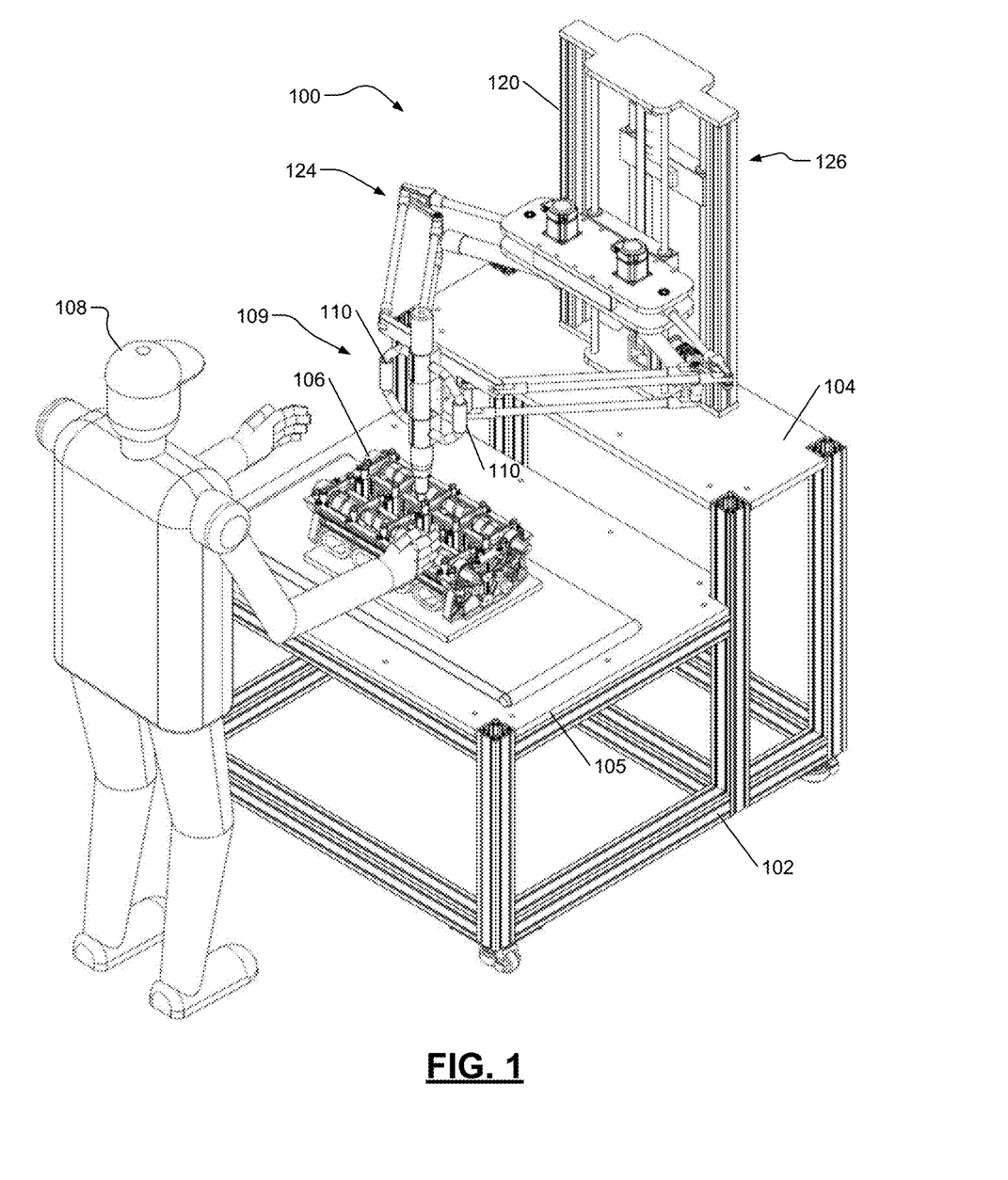
FIG. 1 is a front perspective view of an example of a three degree-of-freedom (3-DOF) robotic system mounted on a stand and including a single lift motor and two bar rotating motors in accordance with the present disclosure.

In an embodiment, the 3-DOF robotic system 100 operates as a collaborative system by which (i) sensing, movement of the platform 146 to a start position, and closed loop feedback is provided by the operator 108, and (ii) sensing, movement of the platform 146 to a start position, and fastening (or torqueing down) a fastener is performed by the robotic system 100. In one embodiment, the operator 108 attaches a fastener to the tip of the fastening tool 112, moves the platform 146 with the assistance of the 3-DOF robotic system 100 to a start position, indicates to start fastening the fastener, and waits to hear and/or see a completion indication. The indication to start fastening may be provided by the operator 108 touching the input device 242, such as a start button on the platform 146 or elsewhere. The input device 242 may be located on the robotic system 100, the frame 120, or elsewhere. The completion indication may be provided by an indicator 244. The indicator 244 may include a light, a speaker, a clicking device configured to generate a "click" sound when a predetermined torque level has been reached on the corresponding fastener, a message on a display, etc. In one embodiment, the fastening tool 112 generates the click sound when a fastener has been torqued down to the predetermined level. In another embodiment, the control module 240 automatically controls initial positioning of the fastening tool to set fastening locations and fastening of fasteners.

The control module 240 controls operation of the rotary motors 140, 142, the motor 147 of the fastening tool 112, and the motor 218 based on feedback from the sensor 230. The sensor 230 may be mounted to the platform 146 as shown and provides feedback to the control module 240. In one embodiment, the sensor 230 is a 6-dimensional force and torque sensor that measures force and torque exerted on the platform 146 by the operator 108 and the fastening tool 112. The sensor 230 measures forces and torques in Cartesian coordinate directions (x, y, z).

Figure 6:
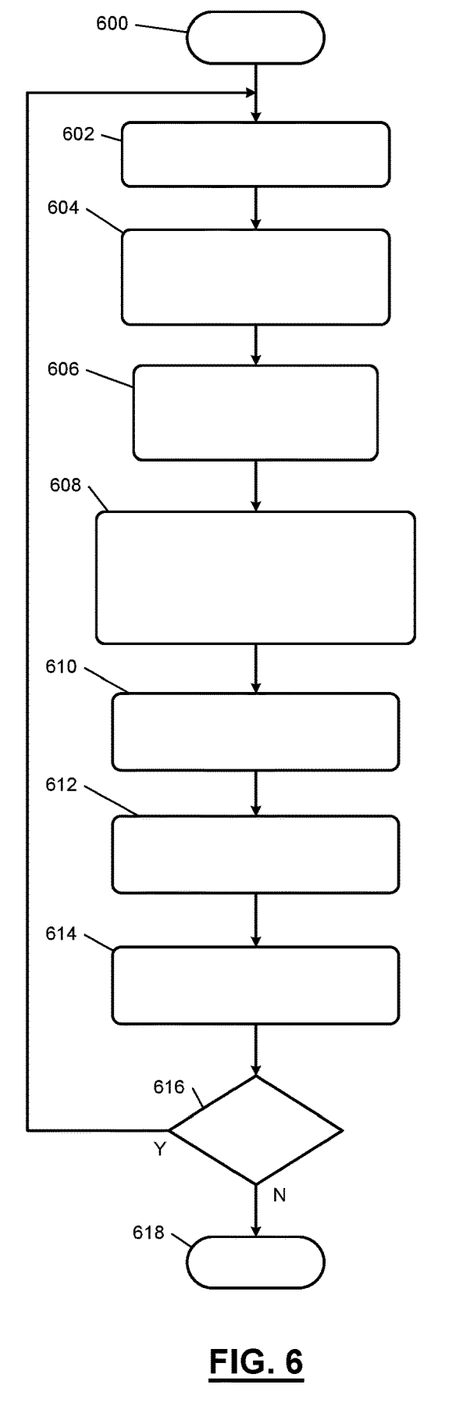
FIG. 6 illustrates a method of operating a robotic system in accordance with the present disclosure In the drawings, reference numbers may be reused to identify similar and/or identical elements.

FIG. 6 shows a method of operating a robotic system, such as any of the robotic systems disclosed herein. The method may begin at 600. At 602, a fastening tool may grab a fastener, as described above. At 604, a sensor (e.g., the sensor 230 of FIG. 2 or other sensor disclosed herein) of a platform (e.g., platform 146 of FIG. 2 or other movable platform) of the robotic system may detect force(s) and torque(s) applied to the platform.

At 606, a control module (e.g., the control module 240 of FIG. 2) may generate one or more control signals respectively for one or more motors based on the output of the sensor. In one embodiment, the operations performed by the control module are implemented as machine-executable instructions stored on a non-transitory computer-readable medium. At 608, the control module provides active compliance by controlling output of the one or more motors to assist in movement of the platform based on the one or more motor control signals. The assisted movement may be in x, y, z directions.

At 610, the control module may receive or generate an indication to begin fastening a fastener. This may be based on an input received from a user via the input device (e.g., the input device 242 of FIG. 2) and/or based on a location and/or orientation of the platform. At 612, the control module via the fastening tool torques down the fastener to a predetermined torque level. At 614, the control module generates an indication that the fastener is torqued down and releases the fastener. If there is another fastener to torque down, operation 602 may be performed, otherwise the method may end at 618.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium (CRM). The term CRM, as used herein, does not encompass transitory electrical or electromagnetic signals propagating through a medium (such as on a carrier wave); the term CRM may therefore be considered tangible and non-transitory. Non-limiting examples of a non-transitory, tangible CRM are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible CRM. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A robotic system comprising:
   a support structure;
   a movable platform;
   a motor mount assembly comprising a plurality of rotary motors, wherein the plurality of rotary motors comprise a first rotary motor and a second rotary motor;
   a first plurality of parallel chains connected to the movable platform, the first rotary motor, and the motor mount assembly;
   a second plurality of parallel chains connected to the movable platform, the second rotary motor, and the motor mount assembly;
   a serial translation assembly connected to the supporting structure and the motor mount assembly and comprising a linear actuator and a third rotary motor;
   a sensor connected to the movable platform and configured to detect force applied by a human operator on the movable platform and generate a signal indicative of the force applied; and
   a control module configured to control the plurality of rotary motors and the third rotary motor based on the signal to assist the human operator in moving the movable platform relative to the supporting structure.

2. The robotic system of claim 1, wherein:
   the first plurality of parallel chains comprises a first chain and a second chain;
   the first chain extends parallel to the second chain;
   the second plurality of parallel chains comprises a third chain and a fourth chain; and
   the third chain extends parallel to the fourth chain.

3. The robotic system of claim 1, wherein:
   the first plurality of parallel chains comprises a first chain;
   the first chain is connected to a first motor of the motor mount assembly and to a plate of the motor mount assembly;
   the second plurality of parallel chains comprises a second chain; and
   the second chain is connected to a second motor of the motor mount assembly and to the plate of the motor mount assembly.

4. The robotic system of claim 1, the first plurality of parallel chains comprises:
   an upper outer chain; and
   a lower inner chain disposed inward and below the upper outer chain.

5. The robotic system of claim 4, wherein the lower inner chain comprises two parallel extending chains.

6. The robotic system of claim 1, wherein the first plurality of parallel chains comprises:
   a first chain comprising three joints, a link, two bars and a fork; and
   a second chain comprising five joints and three bars.

7. The robotic system of claim 1, wherein the first plurality of parallel chains comprises:
   a first chain comprising a first plurality of revolute joints; and
   a second chain comprising a second plurality of revolute joints.

8. The robotic system of claim 1, the first plurality of parallel chains and the second plurality of parallel chains provide a two parallelogram-shaped arrangements.

9. The robotic system of claim 1, wherein the first plurality of parallel chains, the second plurality of parallel chains, the motor mount assembly and the serial translation assembly provide three degrees-of-freedom motion for the movable platform.

10. The robotic system of claim 1, further comprising a fastening tool attached to at least one of the movable platform and the sensor.

11. The robotic system of claim 1, wherein the linear actuator comprises:
a belt;
a first plurality of guide rails;
a mounting block slidable on the first plurality of guide rails and connected to the motor mount assembly and the belt;
a second plurality of guide rails; and
a counterbalance weight slidable on the second plurality of guide rails and connected to the belt.

12. A robotic system comprising:
a support structure;
a movable platform;
a motor mount assembly comprising a plurality of rotary motors, wherein the plurality of rotary motors comprise a first rotary motor and a second rotary motor;
a plurality of parallel chain sets are connected to the movable platform, the plurality of rotary motors, and the motor mount assembly and provide a parallelogram-shaped arrangement;
a serial translation assembly connected to the supporting structure and the motor mount assembly and comprising a linear actuator and a third rotary motor, where the linear actuator moves the plurality of parallel chain sets based on output of the third rotary motor; and
a control module configured to control the plurality of rotary motors and the third rotary motor to provide three degrees-of-freedom motion of the movable platform relative to the supporting structure.

13. The robotic system of claim 12, wherein the plurality of parallel chain sets comprise:
a first upper outer chain;
a second upper outer chain providing a first parallelogram-arrangement with the first upper outer chain;
a first lower inner chain; and
a second lower inner chain providing a second parallelogram-arrangement with the first lower inner chain.

14. The robotic system of claim 13, wherein each of the first upper outer chain, the second upper outer chain, the first lower inner chain and the second lower inner chain include a plurality of joints and a plurality of bars connected serially.

15. The robotic system of claim 13, wherein:
the first upper outer chain extends parallel to the first lower inner chain; and
the second upper outer chain extends parallel to the second lower inner chain.

16. The robotic system of claim 13, wherein:
the first lower inner chain comprises two chains; and
the second lower inner chain comprises two chains.

17. The robotic system of claim 12, further comprising a sensor connected to the movable platform and configured to detect force applied by a human operator on the movable platform and generate a signal indicative of the force applied,
wherein the control module is configured to control operation of the plurality of rotary motors and the third rotary motor to assist the human operator in movement of the movable platform.

18. The robotic system of claim 12, wherein the plurality of parallel chain sets are configured to move parallel to a plane.

19. The robotic system of claim 12, wherein the plurality of parallel chain sets provide:
a first loop for translation of the movable platform; and
a second loop to compensate for torque exerted on the movable platform.

20. The robotic system of claim 12, wherein the linear actuator comprises:
a belt;
a first plurality of guide rails;
a mounting block slidable on the first plurality of guide rails and connected to the motor mount assembly and the belt;
a second plurality of guide rails; and
a counterbalance weight slidable on the second plurality of guide rails and connected to the belt.

* * * * *